(12) United States Patent
Taniyama

(10) Patent No.: US 7,375,903 B2
(45) Date of Patent: May 20, 2008

(54) IMAGING LENS

(75) Inventor: Minoru Taniyama, Saitama (JP)

(73) Assignee: Fujinon Corporation, Saitama (JP)

( * ) Notice: Subject to any disclaimer, the term of this patent is extended or adjusted under 35 U.S.C. 154(b) by 0 days.

(21) Appl. No.: 11/812,064

(22) Filed: Jun. 14, 2007

(65) Prior Publication Data
US 2007/0291376 A1 Dec. 20, 2007

(30) Foreign Application Priority Data
Jun. 15, 2006 (JP) ............ P2006-166584

(51) Int. Cl.
*G02B 13/18* (2006.01)
*G02B 9/34* (2006.01)
(52) U.S. Cl. ............ 359/715; 359/740; 359/773; 359/774
(58) Field of Classification Search ............ 359/715, 359/740, 773, 774
See application file for complete search history.

(56) References Cited

U.S. PATENT DOCUMENTS

| | | | |
|---|---|---|---|
| 5,600,488 A | | 2/1997 | Minefuji et al. |
| 6,747,810 B2 * | | 6/2004 | Sato ............ 359/715 |
| 7,012,765 B2 * | | 3/2006 | Matsui et al. ............ 359/771 |
| 7,206,143 B2 * | | 4/2007 | Kamo et al. ............ 359/771 |
| 7,295,386 B2 * | | 11/2007 | Taniyama ............ 359/772 |
| 2006/0146423 A1 * | | 7/2006 | Amanai ............ 359/773 |
| 2006/0238898 A1 * | | 10/2006 | Shinohara ............ 359/771 |
| 2007/0081259 A1 * | | 4/2007 | Noda ............ 359/774 |

FOREIGN PATENT DOCUMENTS

| | | |
|---|---|---|
| JP | 63-096619 A | 4/1988 |
| JP | 10-48516 A | 2/1998 |
| JP | 2000-180719 A | 6/2000 |
| JP | 2002-221659 A | 8/2002 |
| JP | 2004-302057 A | 10/2004 |
| JP | 2005-4027 A | 1/2005 |
| JP | 2005-4028 A | 1/2005 |
| JP | 2005-24581 A | 1/2005 |

* cited by examiner

*Primary Examiner*—Evelyn A. Lester
(74) *Attorney, Agent, or Firm*—Birch, Stewart, Kolasch & Birch, LLP (57) ABSTRACT

An imaging lens is provided and includes: in order from the object side, a first lens having a convex surface on the object side and having a positive power; an aperture diaphragm; a second lens having a concave surface on the object side and having a negative power; a third lens having a positive power; and a fourth lens having a convex surface on the object side near the optical axis, the fourth lens having a meniscus shape. The imaging lens satisfies conditional expressions:

$$0.2 < D2/f < 0.4 \quad (1)$$

$$TL/f < 1.3 \quad (2)$$

where f represents a focal distance of the imaging lens; D2 represents an air interval between the first lens and second lens along an optical axis of the imaging lens; and TL represents a distance (along the optical axis) from an object-side surface of the first lens to an image forming surface.

22 Claims, 13 Drawing Sheets

EXAMPLE 1

| EXAMPLE 1: LENS DATA | | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | *1 | 1.753 | 0.90 | 1.471 | 76.6 |
| G1 | *2 | 23.464 | 1.09 | | |
| G2 | *3 | −1.859 | 0.77 | 1.604 | 27.2 |
| G2 | *4 | −6.047 | 0.10 | | |
| G3 | *5 | 5.798 | 0.61 | 1.510 | 56.2 |
| G3 | *6 | 8.646 | 0.15 | | |
| G4 | *7 | 1.373 | 0.80 | 1.510 | 56.2 |
| G4 | *8 | 1.398 | 0.70 | | |
| CG | 9 | ∞ | 0.30 | 1.516 | 64.1 |
| CG | 10 | ∞ | 0.43 | | |

(*: ASPHERICAL SURFACE)  (f=4.96, FNO.=2.80, TL=5.75)

FIG. 8

| EXAMPLE 1: ASPHERICAL SURFACE DATA | | | | |
|---|---|---|---|---|
| ASPHERICAL SURFACE COEFFICIENT | SURFACE NUMBER | | | |
| | FIRST SURFACE | SECOND SURFACE | THIRD SURFACE | FOURTH SURFACE |
| K | 2.118E+00 | 0.000E+00 | 2.093E+00 | 3.783E+00 |
| $A_3$ | −1.389E−02 | −3.621E−04 | −4.136E−02 | −1.264E−01 |
| $A_4$ | 1.974E−02 | −1.761E−02 | −7.166E−02 | −1.538E−01 |
| $A_5$ | −8.261E−02 | −1.662E−02 | 1.302E−01 | 1.977E−01 |
| $A_6$ | 1.139E−02 | 1.067E−02 | −7.471E−02 | 8.211E−03 |
| $A_7$ | 2.006E−02 | 2.347E−02 | −1.007E−01 | −5.915E−02 |
| $A_8$ | 1.069E−02 | −2.342E−02 | 3.690E−02 | −1.452E−02 |
| $A_9$ | −2.759E−02 | −9.198E−02 | 1.396E−01 | 1.777E−02 |
| $A_{10}$ | −1.217E−02 | 7.510E−02 | −9.713E−02 | 1.041E−03 |
| | FIFTH SURFACE | SIXTH SURFACE | SEVENTH SURFACE | EIGHTH SURFACE |
| K | −1.023E+01 | −4.442E+00 | −6.701E+00 | −4.073E+00 |
| $A_3$ | −1.457E−01 | 1.145E−02 | 1.040E−01 | 4.656E−02 |
| $A_4$ | 1.109E−01 | −2.036E−03 | −1.037E−01 | −8.155E−02 |
| $A_5$ | 1.264E−02 | −5.593E−03 | −7.978E−03 | 2.883E−02 |
| $A_6$ | −2.086E−02 | −1.872E−04 | 6.038E−03 | −8.142E−03 |
| $A_7$ | −1.894E−02 | −1.975E−03 | 5.696E−03 | −1.679E−03 |
| $A_8$ | 2.734E−03 | −6.801E−04 | −1.084E−03 | 1.371E−03 |
| $A_9$ | 9.806E−03 | 9.953E−04 | −2.458E−04 | 2.587E−04 |
| $A_{10}$ | −4.108E−03 | −2.909E−04 | 2.665E−05 | −1.311E−04 |

FIG. 9

| | EXAMPLE 2: LENS DATA | | | | |
|---|---|---|---|---|---|
| | $S_i$ (SURFACE NUMBER) | $R_i$ (RADIUS OF CURVATURE) | $D_i$ (SURFACE INTERVAL) | $N_{dj}$ (REFRACTIVE INDEX) | $\nu_{dj}$ (ABBE NUMBER) |
| G1 | *1 | 1.978 | 0.85 | 1.471 | 76.6 |
| | *2 | 20.631 | 1.43 | | |
| G2 | *3 | -2.014 | 0.65 | 1.604 | 27.2 |
| | *4 | -6.325 | 0.07 | | |
| G3 | *5 | 3.074 | 0.60 | 1.510 | 56.2 |
| | *6 | 5.838 | 0.15 | | |
| G4 | *7 | 1.446 | 0.80 | 1.510 | 56.2 |
| | *8 | 1.348 | 0.70 | | |
| CG | 9 | ∞ | 0.30 | 1.516 | 64.1 |
| | 10 | ∞ | 0.41 | | |

(*: ASPHERICAL SURFACE)     (f=4.98, FNO.=2.80, TL=5.86)

FIG. 10

| EXAMPLE 2: ASPHERICAL SURFACE DATA | | | | |
|---|---|---|---|---|
| ASPHERICAL SURFACE COEFFICIENT | SURFACE NUMBER | | | |
| | FIRST SURFACE | SECOND SURFACE | THIRD SURFACE | FOURTH SURFACE |
| K | 2.155E+00 | 0.000E+00 | 2.093E+00 | 3.783E+00 |
| $A_3$ | -1.007E-02 | -7.801E-03 | 4.371E-03 | -1.428E-01 |
| $A_4$ | 1.303E-02 | 2.032E-02 | -1.538E-01 | -1.327E-01 |
| $A_5$ | -5.879E-02 | -2.939E-02 | 2.044E-01 | 1.962E-01 |
| $A_6$ | 1.872E-02 | -3.581E-03 | 1.482E-02 | 2.644E-03 |
| $A_7$ | 1.292E-02 | 3.195E-02 | -1.172E-01 | -5.694E-02 |
| $A_8$ | 2.257E-03 | 2.074E-03 | -3.553E-02 | -1.036E-02 |
| $A_9$ | -2.513E-02 | -7.323E-02 | 1.025E-01 | 1.887E-02 |
| $A_{10}$ | 6.176E-03 | 5.158E-02 | -3.008E-02 | -1.816E-03 |
| | FIFTH SURFACE | SIXTH SURFACE | SEVENTH SURFACE | EIGHTH SURFACE |
| K | -7.432E+00 | -1.261E+01 | -8.863E+00 | -4.717E+00 |
| $A_3$ | -1.235E-01 | 5.759E-02 | 9.569E-02 | 4.457E-02 |
| $A_4$ | 1.043E-01 | -7.509E-03 | -9.726E-02 | -8.004E-02 |
| $A_5$ | 1.381E-02 | -9.220E-03 | -7.229E-03 | 3.003E-02 |
| $A_6$ | -1.890E-02 | -5.512E-04 | 5.729E-03 | -8.496E-03 |
| $A_7$ | -1.896E-02 | -1.626E-03 | 5.467E-03 | -1.947E-03 |
| $A_8$ | 2.020E-03 | -3.622E-04 | -1.170E-03 | 1.313E-03 |
| $A_9$ | 9.768E-03 | 1.096E-03 | -2.519E-04 | 2.657E-04 |
| $A_{10}$ | -3.497E-03 | -3.254E-04 | 4.710E-05 | -1.179E-04 |

FIG. 11

| | EXAMPLE 3: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | νdj (ABBE NUMBER) |
| G1 | *1 | 2.393 | 0.88 | 1.592 | 68.3 |
| G1 | *2 | 17.475 | 1.38 | | |
| G2 | *3 | -2.139 | 0.58 | 1.604 | 27.2 |
| G2 | *4 | -7.716 | 0.07 | | |
| G3 | *5 | 3.204 | 0.67 | 1.510 | 56.2 |
| G3 | *6 | 6.739 | 0.19 | | |
| G4 | *7 | 1.505 | 0.80 | 1.510 | 56.2 |
| G4 | *8 | 1.426 | 0.70 | | |
| CG | 9 | ∞ | 0.30 | 1.516 | 64.1 |
| CG | 10 | ∞ | 0.42 | | |

(*: ASPHERICAL SURFACE)   (f=4.98, FNO.=2.80, TL=5.89)

FIG. 12

| ASPHERICAL SURFACE COEFFICIENT | SURFACE NUMBER | | | |
|---|---|---|---|---|
| | FIRST SURFACE | SECOND SURFACE | THIRD SURFACE | FOURTH SURFACE |
| K | 2.226E+00 | 0.000E+00 | 2.093E+00 | 3.783E+00 |
| $A_3$ | -7.822E-03 | -7.585E-03 | -2.688E-03 | -1.471E-01 |
| $A_4$ | 1.060E-02 | 1.009E-02 | -1.632E-01 | -1.315E-01 |
| $A_5$ | -5.154E-02 | -3.140E-02 | 2.069E-01 | 1.973E-01 |
| $A_6$ | 2.446E-02 | -1.795E-04 | 2.937E-02 | 2.729E-03 |
| $A_7$ | 1.189E-02 | 3.301E-02 | -1.142E-01 | -5.549E-02 |
| $A_8$ | -2.072E-03 | -2.061E-03 | -4.216E-02 | -8.560E-03 |
| $A_9$ | -2.644E-02 | -7.802E-02 | 9.727E-02 | 1.974E-02 |
| $A_{10}$ | 1.268E-02 | 5.746E-02 | -2.500E-02 | -2.362E-03 |
| | FIFTH SURFACE | SIXTH SURFACE | SEVENTH SURFACE | EIGHTH SURFACE |
| K | -9.941E+00 | -4.075E+01 | -9.697E+00 | -5.378E+00 |
| $A_3$ | -1.282E-01 | 4.624E-02 | 9.225E-02 | 4.356E-02 |
| $A_4$ | 9.925E-02 | -7.649E-03 | -9.536E-02 | -7.866E-02 |
| $A_5$ | 1.268E-02 | -8.642E-03 | -6.741E-03 | 3.068E-02 |
| $A_6$ | -1.790E-02 | -2.756E-04 | 5.765E-03 | -8.511E-03 |
| $A_7$ | -1.828E-02 | -1.543E-03 | 5.462E-03 | -2.019E-03 |
| $A_8$ | 2.132E-03 | -3.559E-04 | -1.169E-03 | 1.292E-03 |
| $A_9$ | 9.629E-03 | 1.078E-03 | -2.518E-04 | 2.657E-04 |
| $A_{10}$ | -3.619E-03 | -3.413E-04 | 4.713E-05 | -1.130E-04 |

FIG. 13

| | EXAMPLE 4: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | *1 | 1.845 | 0.70 | 1.471 | 76.6 |
| G1 | *2 | 6.572 | 1.80 | | |
| G2 | *3 | -1.968 | 0.42 | 1.604 | 27.2 |
| G2 | *4 | -5.071 | 0.07 | | |
| G3 | *5 | 3.667 | 0.63 | 1.510 | 56.2 |
| G3 | *6 | 10.284 | 0.20 | | |
| G4 | *7 | 1.295 | 0.80 | 1.510 | 56.2 |
| G4 | *8 | 1.239 | 0.70 | | |
| CG | 9 | ∞ | 0.30 | 1.516 | 64.1 |
| CG | 10 | ∞ | 0.39 | | |

(*: ASPHERICAL SURFACE)  (f=4.98, FNO.=2.80, TL=5.91)

FIG. 14

| | EXAMPLE 4: ASPHERICAL SURFACE DATA | | | |
|---|---|---|---|---|
| ASPHERICAL SURFACE COEFFICIENT | SURFACE NUMBER | | | |
| | FIRST SURFACE | SECOND SURFACE | THIRD SURFACE | FOURTH SURFACE |
| K | 1.934E+00 | 0.000E+00 | 2.093E+00 | 3.783E+00 |
| $A_3$ | -9.827E-03 | -4.672E-03 | -4.799E-02 | -2.065E-01 |
| $A_4$ | 1.690E-02 | 2.948E-02 | -1.871E-01 | -1.588E-01 |
| $A_5$ | -5.064E-02 | -1.129E-02 | 1.593E-01 | 1.958E-01 |
| $A_6$ | 2.179E-02 | -1.459E-02 | 2.168E-02 | -1.521E-03 |
| $A_7$ | 1.111E-02 | 4.270E-02 | -1.027E-01 | -6.081E-02 |
| $A_8$ | 7.524E-04 | 2.543E-03 | -3.521E-02 | -1.111E-02 |
| $A_9$ | -2.389E-02 | -7.692E-02 | 9.639E-02 | 1.989E-02 |
| $A_{10}$ | 8.916E-03 | 5.873E-02 | -3.007E-02 | -6.989E-04 |
| | FIFTH SURFACE | SIXTH SURFACE | SEVENTH SURFACE | EIGHTH SURFACE |
| K | -3.973E+00 | -2.070E+01 | -6.588E+00 | -4.054E+00 |
| $A_3$ | -1.276E-01 | 7.028E-02 | 1.076E-01 | 6.251E-02 |
| $A_4$ | 1.058E-01 | -9.640E-03 | -9.446E-02 | -8.048E-02 |
| $A_5$ | 1.453E-02 | -9.275E-03 | -7.204E-03 | 3.008E-02 |
| $A_6$ | -1.740E-02 | -2.848E-04 | 5.492E-03 | -8.405E-03 |
| $A_7$ | -1.875E-02 | -1.498E-03 | 5.371E-03 | -1.881E-03 |
| $A_8$ | 1.720E-03 | -3.462E-04 | -1.184E-03 | 1.350E-03 |
| $A_9$ | 9.581E-03 | 1.077E-03 | -2.497E-04 | 2.728E-04 |
| $A_{10}$ | -3.298E-03 | -3.347E-04 | 5.325E-05 | -1.198E-04 |

FIG. 15

| | EXAMPLE 5: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | *1 | 2.267 | 0.81 | 1.592 | 68.3 |
| G1 | *2 | 12.816 | 1.38 | | |
| G2 | *3 | -2.453 | 0.56 | 1.604 | 27.2 |
| G2 | *4 | 715.668 | 0.07 | | |
| G3 | *5 | 2.783 | 0.75 | 1.510 | 56.2 |
| G3 | *6 | 7.776 | 0.19 | | |
| G4 | *7 | 1.443 | 0.80 | 1.510 | 56.2 |
| G4 | *8 | 1.374 | 0.70 | | |
| CG | 9 | ∞ | 0.30 | 1.516 | 64.1 |
| CG | 10 | ∞ | 0.36 | | |

(*: ASPHERICAL SURFACE)   (f=4.98, FNO.=2.80, TL=5.82)

FIG. 16

| | EXAMPLE 5: ASPHERICAL SURFACE DATA | | | |
|---|---|---|---|---|
| ASPHERICAL SURFACE COEFFICIENT | SURFACE NUMBER | | | |
| | FIRST SURFACE | SECOND SURFACE | THIRD SURFACE | FOURTH SURFACE |
| K | 2.202E+00 | 0.000E+00 | 2.093E+00 | 3.783E+00 |
| $A_3$ | -6.598E-03 | -5.845E-03 | -1.701E-02 | -1.652E-01 |
| $A_4$ | 8.493E-03 | 7.214E-03 | -1.522E-01 | -1.328E-01 |
| $A_5$ | -5.238E-02 | -2.753E-02 | 1.926E-01 | 1.995E-01 |
| $A_6$ | 2.633E-02 | 5.005E-03 | 2.908E-02 | 1.448E-03 |
| $A_7$ | 1.215E-02 | 3.259E-02 | -1.111E-01 | -5.613E-02 |
| $A_8$ | -3.654E-03 | -8.760E-03 | -4.249E-02 | -7.750E-03 |
| $A_9$ | -2.775E-02 | -8.406E-02 | 9.252E-02 | 2.059E-02 |
| $A_{10}$ | 1.334E-02 | 6.539E-02 | -2.679E-02 | -3.472E-03 |
| | FIFTH SURFACE | SIXTH SURFACE | SEVENTH SURFACE | EIGHTH SURFACE |
| K | -8.083E+00 | -1.009E+01 | -9.148E+00 | -5.532E+00 |
| $A_3$ | -1.335E-01 | 3.394E-02 | 9.573E-02 | 4.902E-02 |
| $A_4$ | 9.420E-02 | -9.251E-03 | -9.361E-02 | -7.743E-02 |
| $A_5$ | 1.139E-02 | -8.712E-03 | -6.725E-03 | 3.130E-02 |
| $A_6$ | -1.678E-02 | -2.963E-05 | 5.635E-03 | -8.600E-03 |
| $A_7$ | -1.734E-02 | -1.276E-03 | 5.391E-03 | -2.119E-03 |
| $A_8$ | 2.439E-03 | -2.710E-04 | -1.197E-03 | 1.251E-03 |
| $A_9$ | 9.554E-03 | 1.075E-03 | -2.526E-04 | 2.683E-04 |
| $A_{10}$ | -3.834E-03 | -3.820E-04 | 5.295E-05 | -1.070E-04 |

FIG. 17

| | EXAMPLE 6: LENS DATA | | | | |
|---|---|---|---|---|---|
| | Si (SURFACE NUMBER) | Ri (RADIUS OF CURVATURE) | Di (SURFACE INTERVAL) | Ndj (REFRACTIVE INDEX) | vdj (ABBE NUMBER) |
| G1 | *1 | 1.821 | 0.86 | 1.471 | 76.6 |
| G1 | *2 | 100.313 | 1.08 | | |
| G2 | *3 | -1.914 | 0.79 | 1.604 | 27.2 |
| G2 | *4 | -6.438 | 0.09 | | |
| G3 | *5 | 6.860 | 0.62 | 1.510 | 56.2 |
| G3 | *6 | 7.893 | 0.15 | | |
| G4 | *7 | 1.340 | 0.80 | 1.510 | 56.2 |
| G4 | *8 | 1.413 | 0.70 | | |
| CG | 9 | ∞ | 0.30 | 1.516 | 64.1 |
| CG | 10 | ∞ | 0.50 | | |

(*: ASPHERICAL SURFACE)   (f=5.00, FNO.=2.80, TL=5.79)

FIG. 18

| | EXAMPLE 6: ASPHERICAL SURFACE DATA | | | |
|---|---|---|---|---|
| ASPHERICAL SURFACE COEFFICIENT | SURFACE NUMBER | | | |
| | FIRST SURFACE | SECOND SURFACE | THIRD SURFACE | FOURTH SURFACE |
| K | 2.349E+00 | 0.000E+00 | 2.093E+00 | 3.783E+00 |
| $A_3$ | -6.632E-03 | -1.825E-03 | -3.141E-02 | -1.304E-01 |
| $A_4$ | 4.084E-03 | -1.182E-02 | -8.670E-02 | -1.452E-01 |
| $A_5$ | -7.833E-02 | -2.715E-02 | 1.584E-01 | 2.012E-01 |
| $A_6$ | 1.437E-02 | 4.438E-03 | -5.101E-02 | 1.045E-02 |
| $A_7$ | 1.961E-02 | 3.061E-02 | -1.010E-01 | -5.707E-02 |
| $A_8$ | 8.385E-03 | -7.841E-03 | 2.188E-02 | -1.310E-02 |
| $A_9$ | -2.996E-02 | -8.353E-02 | 1.294E-01 | 1.807E-02 |
| $A_{10}$ | -1.245E-02 | 5.335E-02 | -7.909E-02 | -1.764E-04 |
| | FIFTH SURFACE | SIXTH SURFACE | SEVENTH SURFACE | EIGHTH SURFACE |
| K | -1.002E+01 | -1.000E+01 | -7.014E+00 | -4.578E+00 |
| $A_3$ | -1.523E-01 | -1.536E-03 | 1.041E-01 | 5.368E-02 |
| $A_4$ | 1.028E-01 | -5.542E-03 | -1.031E-01 | -8.211E-02 |
| $A_5$ | 1.101E-02 | -6.734E-03 | -7.875E-03 | 2.893E-02 |
| $A_6$ | -2.010E-02 | 1.080E-04 | 5.876E-03 | -8.378E-03 |
| $A_7$ | -1.788E-02 | -1.481E-03 | 5.591E-03 | -1.788E-03 |
| $A_8$ | 3.490E-03 | -4.365E-04 | -1.126E-03 | 1.353E-03 |
| $A_9$ | 9.957E-03 | 9.747E-04 | -2.500E-04 | 2.592E-04 |
| $A_{10}$ | -4.954E-03 | -3.942E-04 | 3.716E-05 | -1.280E-04 |

FIG. 19

| | CONDITIONAL EXPRESSION (1) D2/f | CONDITIONAL EXPRESSION (2) TL/f | CONDITIONAL EXPRESSION (3) f1/f | CONDITIONAL EXPRESSION (4) n1 | CONDITIONAL EXPRESSION (5) ν1 | CONDITIONAL EXPRESSION (6) \|f2/f\| | CONDITIONAL EXPRESSION (7) f3/f |
|---|---|---|---|---|---|---|---|
| VALUE RELATING TO CONDITIONAL EXPRESSIONS | | | | | | | |
| EXAMPLE 1 | 0.22 | 1.16 | 0.80 | 1.47 | 76.6 | 0.96 | 6.49 |
| EXAMPLE 2 | 0.29 | 1.18 | 0.92 | 1.47 | 76.6 | 1.04 | 2.38 |
| EXAMPLE 3 | 0.28 | 1.18 | 0.92 | 1.59 | 68.3 | 1.02 | 2.26 |
| EXAMPLE 4 | 0.36 | 1.19 | 1.04 | 1.47 | 76.6 | 1.13 | 2.17 |
| EXAMPLE 5 | 0.28 | 1.17 | 0.91 | 1.59 | 68.3 | 0.81 | 1.63 |
| EXAMPLE 6 | 0.22 | 1.16 | 0.78 | 1.47 | 76.6 | 0.96 | 17.08 |

EXAMPLE 1

FIG. 20A — SPHERICAL ABERRATION
FIG. 20B — ASTIGMATISM
FIG. 20C — DISTORTION

EXAMPLE 2

FIG. 21A
SPHERICAL ABERRATION

FIG. 21B
ASTIGMATISM

FIG. 21C
DISTORTION

EXAMPLE 3

FIG. 22A
SPHERICAL ABERRATION

FIG. 22B
ASTIGMATISM

FIG. 22C
DISTORTION

EXAMPLE 4

EXAMPLE 5

IMAGING LENS

BACKGROUND OF THE INVENTION

1. Field of the Invention

The present invention relates to an imaging lens having a fixed focus which is suitable for use in a small-size imaging apparatus, for example, a digital camera using an imaging device such as a CCD (Charge Coupled Device) or a CMOS (Complementary Metal Oxide Semiconductor) or the like, and a camera using a silver halide film.

2. Description of Related Art

Recently, as personal computers have become popular in regular families, there has been rapidly spread a digital still camera (which is hereinafter referred to as a digital camera simply) which can input image information about scenes, persons and the like photographed into the personal computer. Also, as the performance of a cellular phone has been enhanced, the incorporation of a module camera for inputting images into a cellular phone (a module camera for a cellular phone) has been increasing.

In these imaging apparatus, there are used imaging devices such as a CCD or a CMOS. In such imaging apparatus, recently, because the imaging device has been downsized, the whole of the imaging apparatus has been also downsized greatly. Also, since the number of pixels included in the imaging device has also been increasing, the resolution and performance of the imaging device have been enhanced.

As an imaging lens which is used in such downsized imaging apparatus, there are known imaging lenses which are disclosed in, for example, the below-mentioned patent reference. In JP-A-10-48516 and JP-A-2002-221659, there is disclosed an imaging lens having a three-lens configuration. In JP-A-2004-302057, JP-A-2005-24581, JP-A-2005-4027 and JP-A-2005-4028, there is disclosed an imaging lens having a four-lens configuration. In the imaging lens disclosed in JP-A-2004-302057, there is interposed an aperture diaphragm between the second and third lenses in order from the object side, and, in the imaging lens disclosed in JP-A-2005-24581, an aperture diaphragm is disposed nearest to the object side.

As described above, recently, as the imaging device has been reduced in size and has been increased in the number of pixels included therein, especially, the imaging lens for a digital camera has been required that it has an enhanced resolution performance and provides a downsized structure. On the other hand, with respect to the imaging lens for a module camera for a cellular phone, there have been mainly required cost performance and compactness; however, recently, in the module camera for a cellular phone as well, the number of pixels included in the imaging device has been increasing and thus the need for the enhanced performance of the module camera for a cellular phone has been increasing.

Thus, there has been desired the development of various lenses which are improved comprehensively in the cost, image forming performance and compactness thereof. For example, there has been desired the development of a low-cost and high-performance imaging lens which not only can secure compactness capable of use in a module camera for a cellular phone but also can provide a high performance capable of use in a digital camera.

To meet the above demands, for example, there can be employed a structure in which, for the purpose of downsizing and cost reduction, there are used three or four lenses and, for the purpose of performance enhancement, an aspherical surface is used positively in the lenses. In this case, the aspherical surface contributes to the downsizing and enhanced performance, but it provides a disadvantage in manufacture and thus their manufacturing costs are easy to increase. Therefore, in use of the aspherical surface, preferably, the manufacturing cost performance thereof may be taken into consideration sufficiently. As regards the lenses disclosed in the above respective references, the three or four-lens configuration is used and aspherical surfaces are used. However, in this lens configuration, for example, the image forming performance and compactness do not go together sufficiently.

On the other hand, in an imaging device for photographing a static image, to reduce signal noise, provision of a shutter mechanism is required. To reduce the shading, preferably, the shutter mechanism may be disposed near to an optical aperture diaphragm; and, to secure its telecentric performance, the optical aperture diaphragm may be preferably disposed nearest to the object side. However, from the before-mentioned viewpoint, when the aperture diaphragm and shutter mechanism are disposed nearer to the object side than a first lens, the whole length of the lenses is large, which provides a disadvantage in downsizing the imaging device. To solve this, there is employed a structure in which the aperture diaphragm and shutter mechanism are disposed in the interior of the lens system, for example, they are interposed between the first and second lenses; however, in this arrangement, it is necessary to secure a sufficient space for arranging the aperture diaphragm and shutter mechanism within the lens system.

SUMMARY OF THE INVENTION

An object of an illustrative, non-limiting embodiment of the present invention is to provide a compact and high-performance imaging lens which uses a four-lens configuration and can secure a sufficient internal interval for arrangement of a shutter mechanism.

According to an aspect of the invention, there is provided an imaging lens including: in order from an object side of the imaging lens, a first lens having a convex surface on the object side thereof and having a positive power; an aperture diaphragm; a second lens having a concave surface on the object side thereof and having a negative power; a third lens having a positive power; and a fourth lens having a convex surface on the object side thereof and near an optical axis thereof, the fourth lens having a meniscus shape, wherein the imaging lens satisfies conditional expressions:

$$0.2 < D2/f < 0.4 \quad (1)$$

$$TL/f < 1.3 \quad (2)$$

wherein f represents a focal distance of the imaging lens; D2 represents an air interval between the first lens and second lens along an optical axis of the imaging lens; and TL represents a distance along the optical axis from an object-side surface of the first lens to an image forming surface.

According to the imaging lens, a four-lens configuration are used and the power arrangements and shapes of lenses can be optimized and, for the power of the whole of the imaging lens, the air interval between the first and second lenses and the lens lengths of the imaging lens can be optimized, thereby being able to secure a sufficient space for arrangement of a shutter mechanism within the lens system. Also, the imaging lens is advantageous in both downsizing and performance enhancement.

The imaging lens may satisfy conditional expressions: that is, $$0.7 < f1/f < 1.2 \quad (3)$$

$$1.45 < n1 < 1.6 \quad (4)$$

$$v1 > 60 \quad (5)$$

$$0.8 < f2/f < 1.3 \quad (6)$$

$$1.0 < f3/f < 20 \quad (7)$$

wherein f1 represents a focal distance of the first lens; n1 represents a refractive index of the first lens at the d-line; v1 represents an Abbe number of the first lens at the d-line; f2 represents a focal distance of the second lens; and f3 represents a focal distance of the third lens. Specifically, by satisfying the conditional expression (3), an increase in the size of the imaging lens can be prevented and an increase in the spherical aberration can be prevented. Also, by satisfying the conditional expressions (4) and (5), the longitudinal chromatic aberration of the imaging lens can be reduced. Further, by satisfying the conditional expressions (6) and (7), not only the high-order aberration of the imaging lens such as the spherical aberration and coma aberration can be corrected properly but also the size of the imaging lens can be reduced advantageously.

Further, each of the first, second, third and fourth lenses may have at least one aspheric surface. This makes it easy to obtain a high aberration performance. Also, the first lens may be made of an optical glass, while each of the second, third and fourth lenses may be made of a resin material. This provides an advantage in reducing various aberrations (especially, chromatic aberration) and also can realize the reduced weight of the imaging lens.

BRIEF DESCRIPTION OF THE DRAWINGS

The features of the invention will appear more fully upon consideration of the exemplary embodiment of the invention, which are schematically set forth in the drawings, in which:

FIGS. 20A to 20C show aberrations in the imaging lens according to Example 1.

FIGS. 21A to 21C show aberrations in the imaging lens according to Example 2.

FIGS. 22A to 22C show aberrations in the imaging lens according to Example 3.

FIGS. 23A to 23C show aberrations in the imaging lens according to Example 4.

FIGS. 24A to 24C show aberrations in the imaging lens according to Example 5, FIGS. 25A to 25C show aberrations in the imaging lens according to Example 6.

DETAILED DESCRIPTION OF THE EXEMPLARY EMBODIMENTS

Although the invention will be described below with reference to the exemplary embodiments thereof, the following exemplary embodiments and modifications do not restrict the invention.

According to an exemplary embodiment of the invention, an imaging lens includes, in order from the object lens, a first lens having a convex surface on the object side and having a positive power, a second lens having a concave surface on the object side and having a negative power, a third lens having a positive power, and a meniscus-shaped fourth lens having a convex surface on the object side and near the optical axis; and also satisfies specific conditional expressions. Due to this configuration, while securing a sufficient space for providing a shutter mechanism, the imaging lens not only can realize downsizing but also can provide a high image forming performance.

Now, description will be given below in detail of an imaging lens according to exemplary embodiments of the invention with reference to the accompanying drawings.

Figure 1:
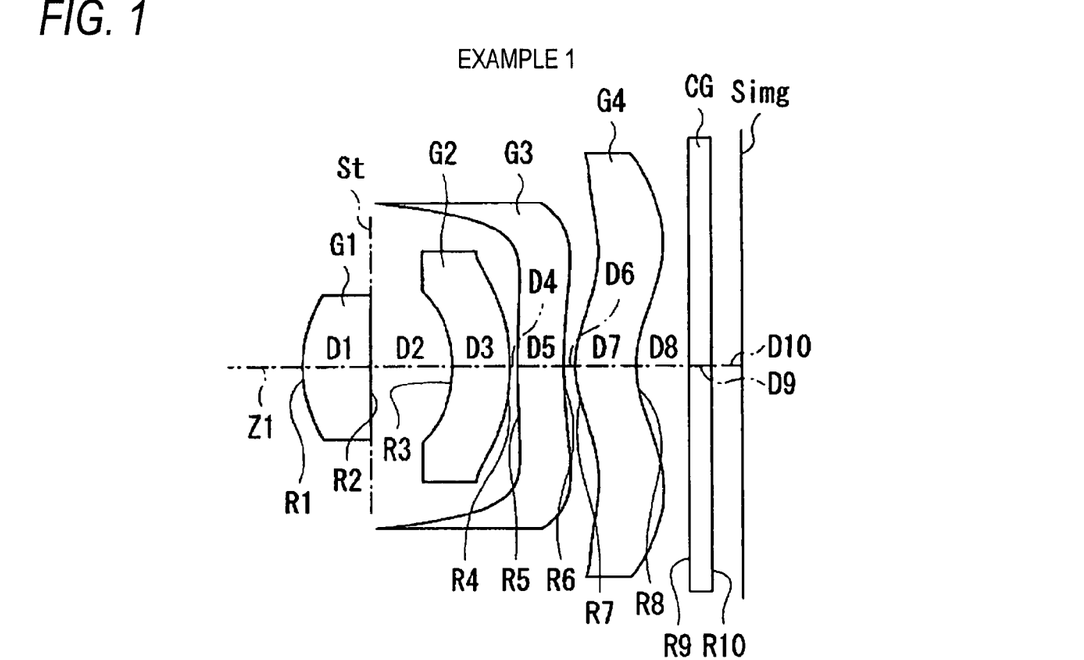
FIG. 1 is a section view of an imaging lens according to a first exemplary embodiment of the invention, corresponding to Example 1.
Figure 2:
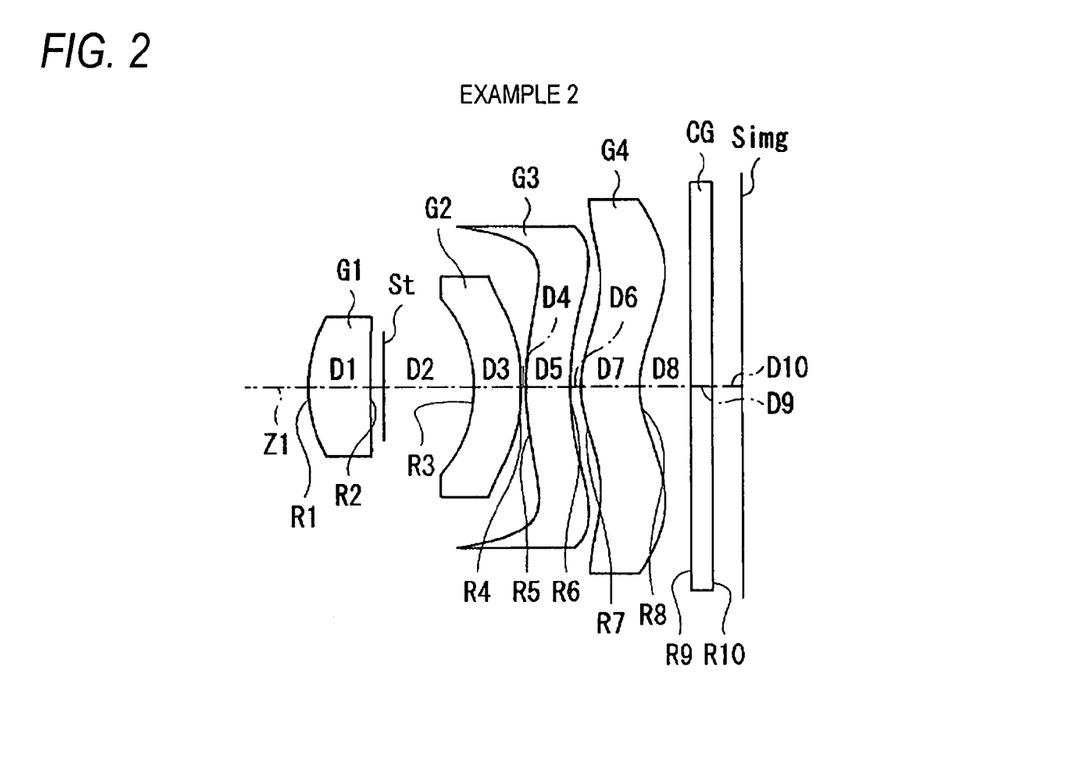
FIG. 2 is a section view of an imaging lens according to a second exemplary embodiment of the invention, corresponding to Example 2.
Figure 3:
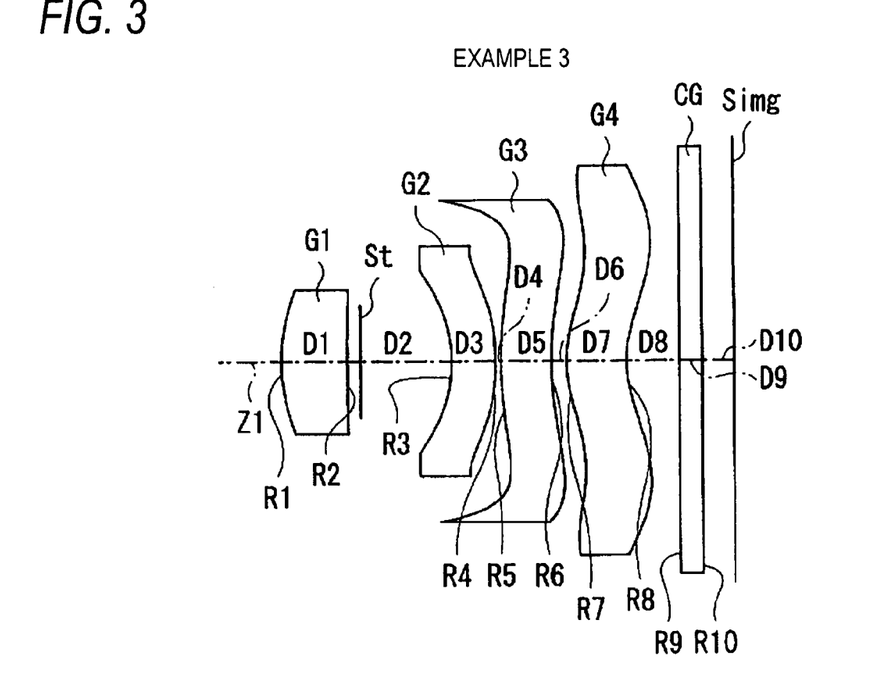
FIG. 3 is a section view of an imaging lens according to a third exemplary embodiment of the invention, corresponding to Example 3.
Figure 4:
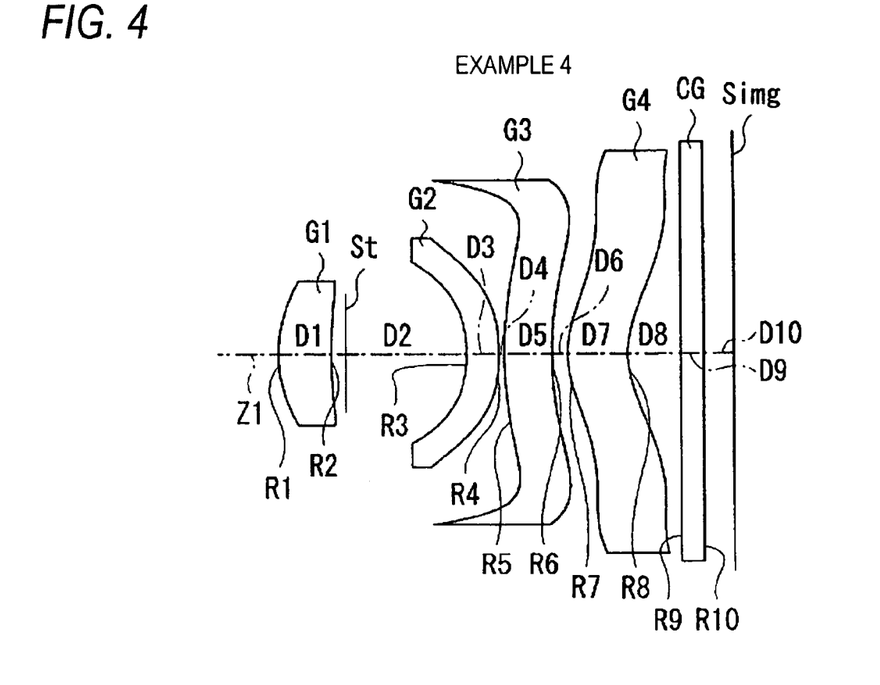
FIG. 4 is a section view of an imaging lens according to a fourth exemplary embodiment of the invention, corresponding to Example 4.
Figure 5:
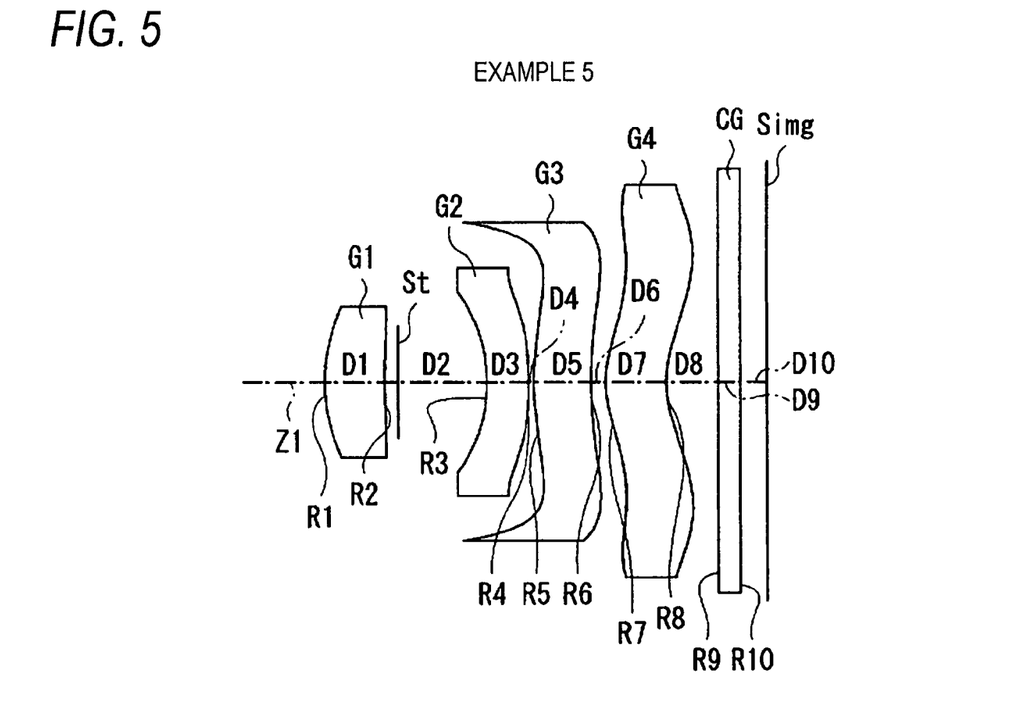
FIG. 5 is a section view of an imaging lens according to a fifth exemplary embodiment of the invention, corresponding to Example 5.
Figure 6:
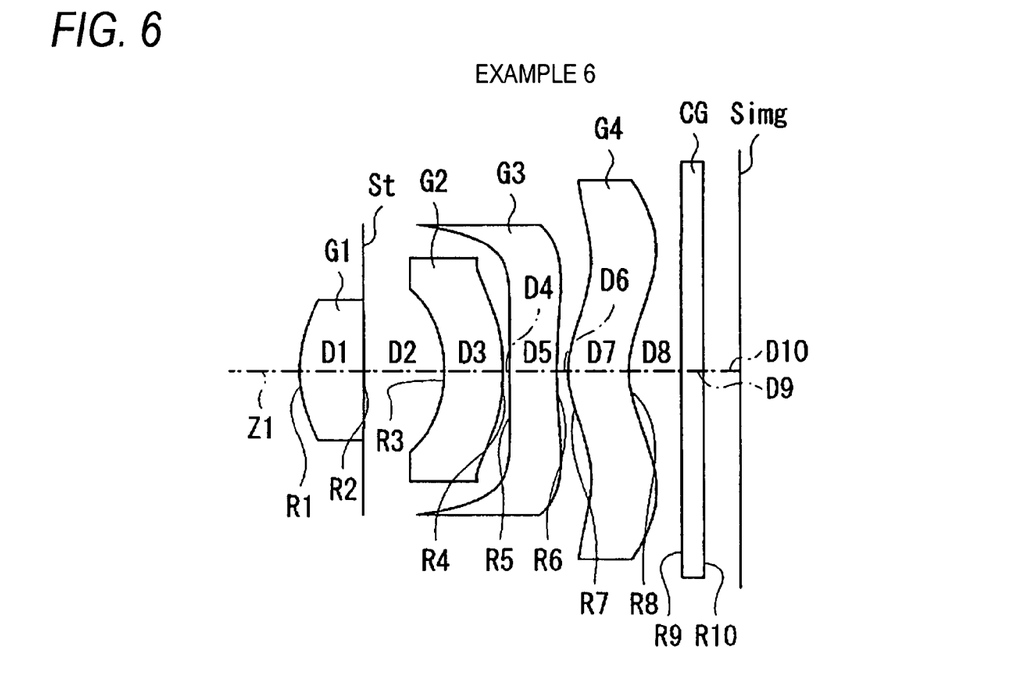
FIG. 6 is a section view of an imaging lens according to a sixth exemplary embodiment of the invention, corresponding to Example 6.
Figure 11:
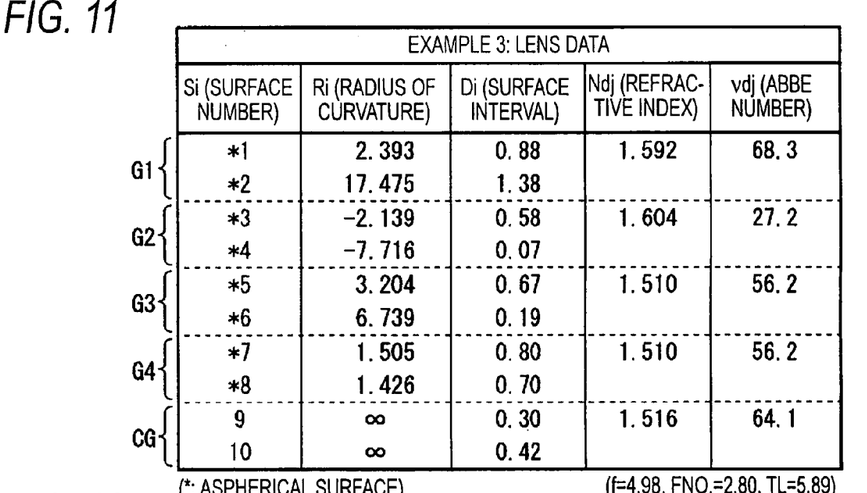
FIG. 11 shows lens data in the imaging lens according to Example 3.
Figure 12:
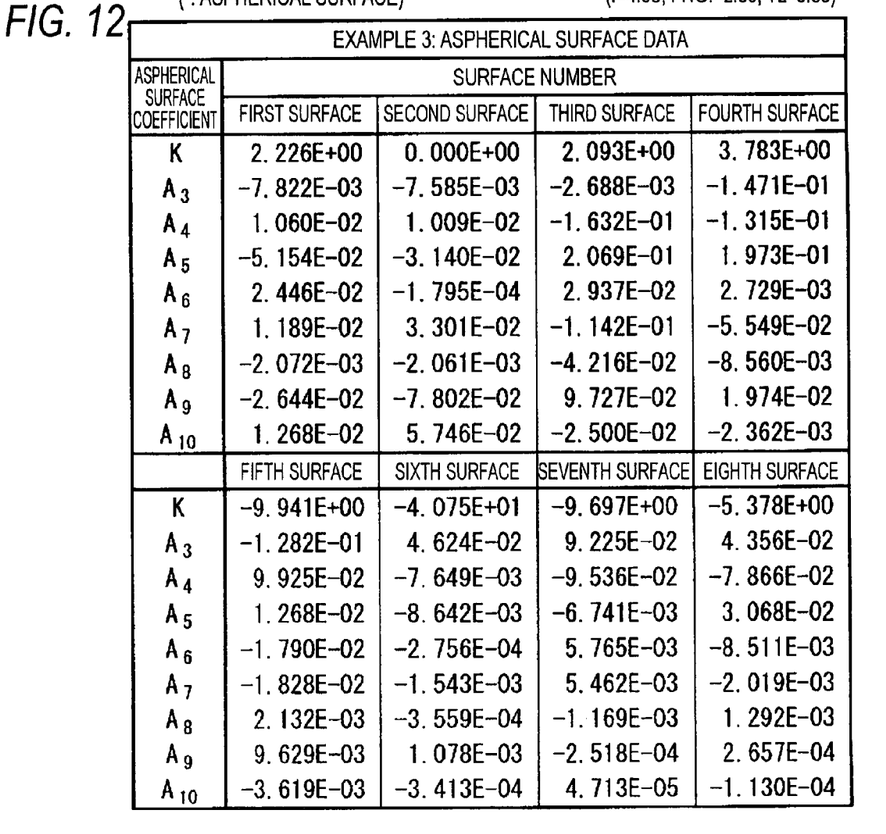
FIG. 12 shows aspherical surface data of the imaging lens according to Example 3.
Figure 13:
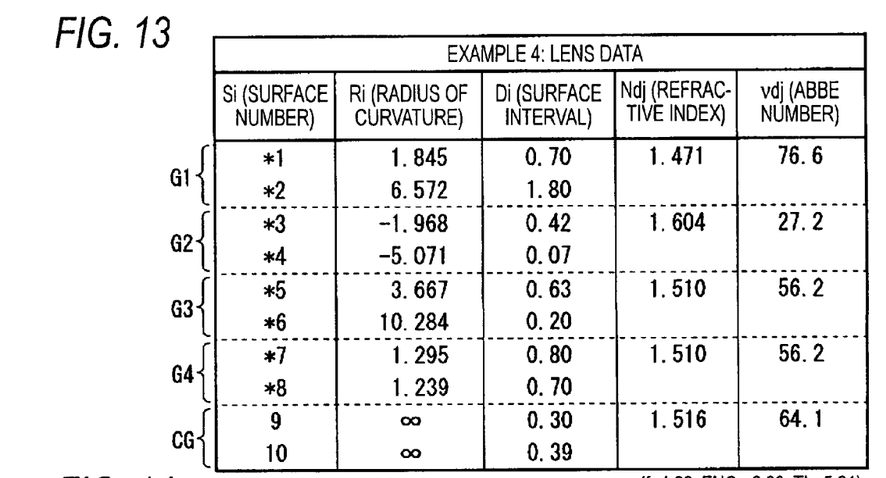
FIG. 13 shows lens data in the imaging lens according to Example 4.
Figure 14:
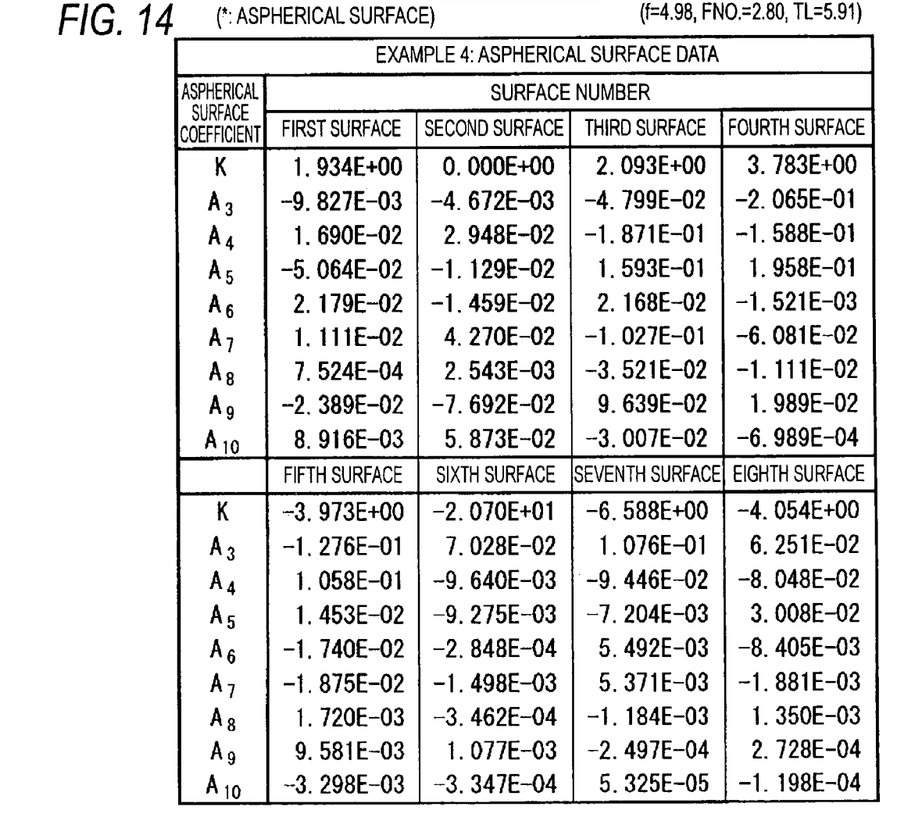
FIG. 14 shows aspherical surface data of the imaging lens according to Example 4.
Figure 15:
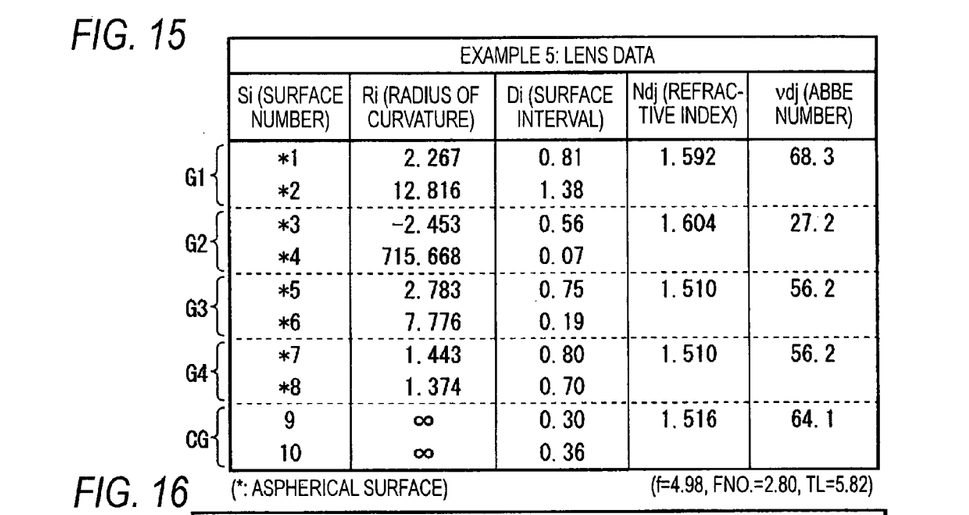
FIG. 15 shows lens data in the imaging lens according to Example 5.
Figure 16:
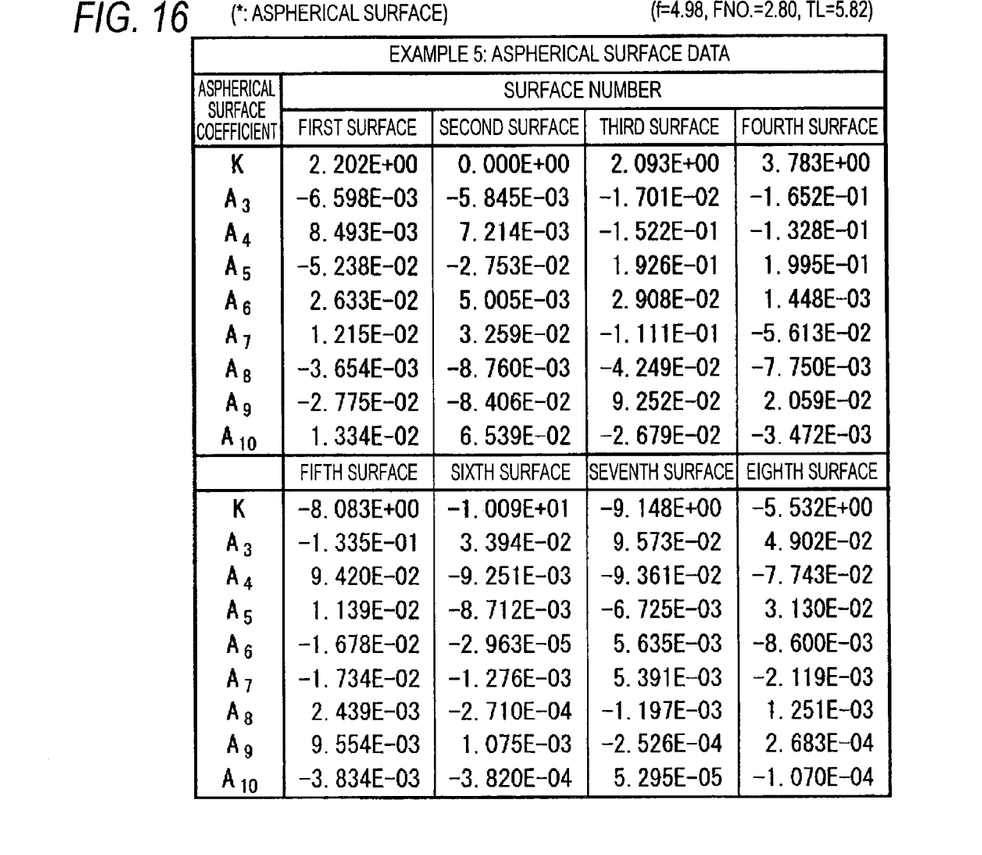
FIG. 16 shows aspherical surface data of the imaging lens according to Example 5.
Figure 17:
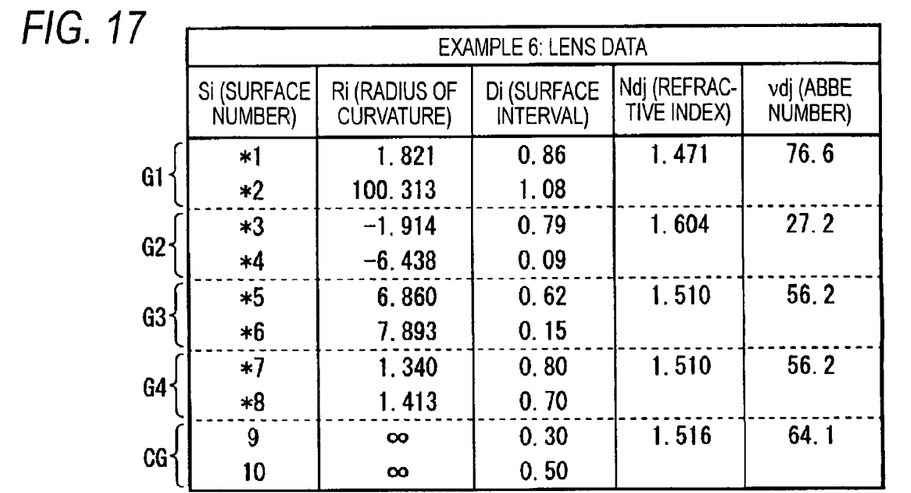
FIG. 17 shows lens data in the imaging lens according to Example 6.
Figure 18:
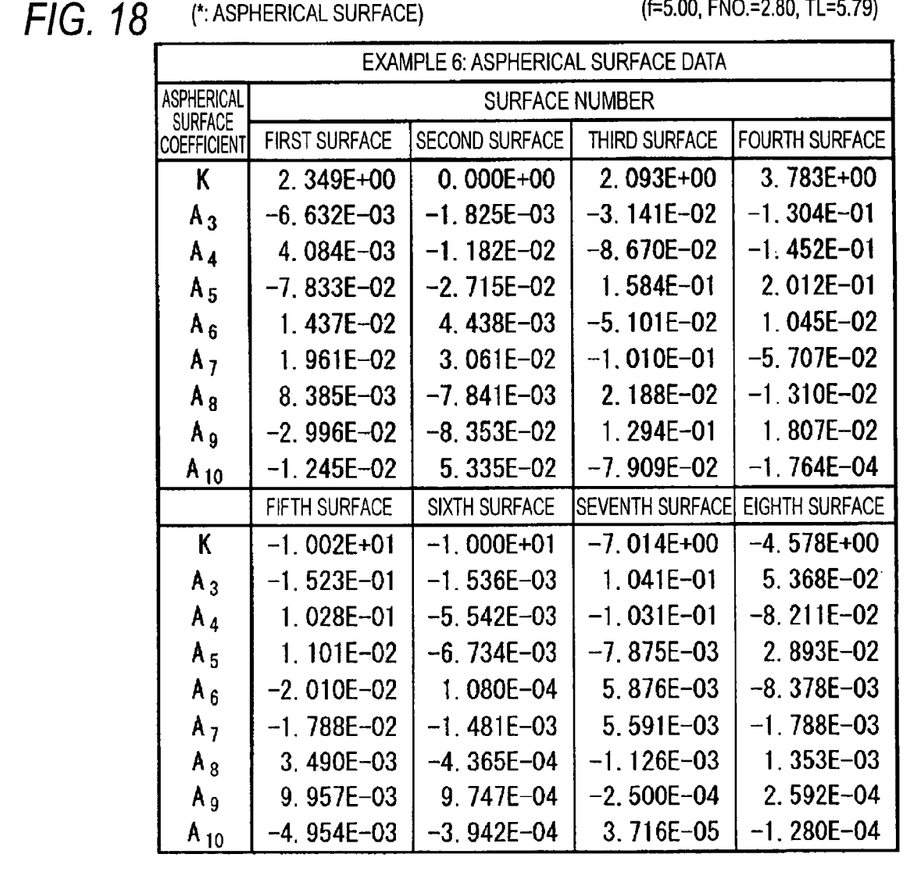
FIG. 18 shows aspherical surface data of the imaging lens according to Example 6.

FIG. 1 shows a first exemplary embodiment of an imaging lens of the invention. This first embodiment corresponds to a lens configuration that is employed in a numerical example 1 (FIGS. 7 and 8) which will be discussed later. Similarly, FIG. 2 shows a second exemplary embodiment and corresponds to a numerical example 2 (FIGS. 9 and 10) which will be discussed later. Similarly, FIG. 3 shows a third exemplary embodiment and corresponds to a numerical example 3 (FIGS. 11 and 12) which will be discussed later. Similarly, FIG. 4 shows a fourth exemplary embodiment and corresponds to a numerical example 4 (FIGS. 13 and 14) which will be discussed later. Similarly, FIG. 5 shows a fifth exemplary embodiment and corresponds to a numerical example 5 (FIGS. 15 and 16) which will be discussed later. Similarly, FIG. 6 shows a sixth exemplary embodiment and corresponds to a numerical example 6 (FIGS. 17 and 18) which will be discussed later. In FIG. 1, where the surface of a constituent element disposed nearest to the object side is regarded as the first surface and signs are respectively given in increasing order toward the image side (the image forming side), a sign Ri stands for the radius of curvature of an i-th surface. And, a sign Di represents a surface interval along an optical axis Z1 between the i-th surface and (i+1)-th surface. By the way, since the respective embodiments are basically similar in configuration, the following description will be given based on the embodiment of an imaging lens shown in FIG. 1 and, as the need arises, the embodiments shown in FIGS. 2 to 6 will also be discussed.

The imaging lens can be incorporated and used, for example, in a module camera for a cellular phone, a digital camera or the like using an imaging device such as a CCD or a CMOS. The imaging lens includes, in order from the object side, a first lens G1, an aperture diaphragm St, a second lens G2, a third lens G3 and a fourth lens G4 along the optical axis Z1. In the image forming surface (imaging surface) Simg of this imaging lens, there is arranged an imaging device (not shown) such as a CCD. In the vicinity of the imaging surface of the imaging device, there is arranged a cover glass CG which is used to protect the imaging surface. Between the fourth lens G4 and image forming surface (imaging surface), besides the cover glass CG, there may also be interposed other optical member such as an infrared ray cut filter or a low-pass filter.

The first lens G1 has a convex surface on the object side near the optical axis, and has a positive power. The first lens G1 may have a meniscus shape. The first lens G1 may be structured such that, for example, at least one of the object-side surface and the image-side surface is an aspherical surface, more preferably, both of them may be aspherical surfaces.

The second lens G2 has a concave surface on the object side near the optical axis, and has a negative power. The second lens G2 may have a meniscus shape. However, as in the fifth embodiment, the second lens G2 may also be shaped such that their both surfaces are concave surfaces near the optical axis. The second lens G2 may be structured such that, for example, at least one of the object-side surface and the image-side surface is an aspherical surface, more preferably, both of them may be aspherical surfaces.

The third lens G3 has a positive power, and may have a convex surface on the object side near the optical axis. The third lens G3 may have a meniscus shape. The third lens G3 may be structured such that, for example, at least one of the object-side surface and the image-side surface is an aspherical surface. Especially, the object-side surface may have an aspherical surface shape which, in the range of the effective aperture thereof, reduces in the positive power as it approaches the peripheral portion thereof, while the image-side surface may have an aspherical surface shape which, in the range of the effective aperture thereof, reduces in the negative power as it approaches the peripheral portion thereof. In other words, the object-side surface may be an aspherical surface which has a convex shape near the optical axis and has a concave shape in the peripheral portion thereof; and the image-side surface may be an aspherical surface which has a concave shape near the optical axis and has a convex shape in the peripheral portion thereof.

The fourth lens G4 has a meniscus shape and has a convex surface on the object side near the optical axis. The fourth lens G4 may have a positive power. The fourth lens G4 may be structured such that, for example, at least one of the object-side surface and the image-side surface is an aspherical surface. Especially, in the range of the effective aperture thereof, the object-side surface may be an aspherical surface which reduces in the positive power as it approaches the peripheral portion thereof, while the image-side surface may be an aspherical surface which reduces in the negative power as it approaches the peripheral portion thereof. In other words, the object-side surface may be an aspherical surface which has a convex shape near the optical axis and has a concave shape in the peripheral portion thereof; and the image-side surface may be an aspherical surface which has a concave shape near the optical axis and has a convex shape in the peripheral portion thereof.

Also, the first lens G1 may be made of an optical glass which provides small dispersion, whereas each of the second lens G2, third lens G3 and fourth lens G4 may be made of a resin material.

Further, the imaging lens satisfies the following conditional expressions. Here, f represents the focal distance of the entire imaging lens; D2 represents an air interval between the first lens G1 and second lens G2 along the optical axis Z1; and, TL represents a distance from the object-side surface of the first lens G1 to the imaging surface (provided that a thickness of the cover glass CG along the optical axis is air-converted).

$$0.2 < D2/f < 0.4 \quad (1)$$

$$TL/f < 1.3 \quad (2)$$

Also, the following conditional expressions may be satisfied. Here, f1 represents the focal distance of the first lens G1; f represents of the focal distance of the entire imaging lens; n1 represents the refractive index of the first lens G1 at the d-line; v1 represents the Abbe number of the first lens G1 at the d-line; f2 represents the focal distance of the second lens G2; and, f3 represents the focal distance of the third lens G3.

$$0.7 < f1/f < 1.2 \quad (3)$$

$$1.45 < n1 < 1.6 \quad (4)$$

$$v1 > 60 \quad (5)$$

$$0.8 < |f2/f| < 1.3 \quad (6)$$

$$1.0 < f3/f < 20 \quad (7)$$

Next, description will be given below of the operation and effects of the above imaging lens according to the present embodiment.

According to the imaging lens, the first lens G1 and third lens G3 each has a positive power and the second lens G2 have a negative power, and the first lens G1, second lens G2 and fourth lens G4 have their specific shapes, whereby the power arrangement and lens shape of the entire imaging lens can be optimized. Also, since the imaging lens satisfies the conditional expressions (1) and (2), the air interval between the first lens G1 and second lens G2 as well as the lens length of the entire imaging lens can be optimized. Further, because the aperture diaphragm St is interposed between the image-side surface of the first lens G1 and the object-side surface of the second lens G2, there is provided an advantage that the whole of the imaging lens can be downsized. Generally, the nearer to the object side the position of the aperture diaphragm St is, the easier it is to secure the telecentric performance of the imaging lens (by which the incident angle of the principal ray into the imaging device is made to be parallel to the optical axis); and, when the shutter mechanism is arranged, it may be arranged near to the aperture diaphragm St in order to reduce the shading. On the other hand, when the aperture diaphragm St and shutter mechanism are arranged nearer to the object side than the first lens G1, the space for arrangement of them is further added as the optical length, which unfavorably provides a disadvantage in reducing the size (the height) of the whole structure of the imaging lens.

Also, according to the imaging lens, since the power of the first lens G1 is set to satisfy the conditional expression (3), an increase in the size of the imaging lens and an increase in the spherical aberration can be prevented. Further, because the first lens G1 is made of an optical glass that can satisfy the conditional expressions (4) and (5), the longitudinal chromatic aberration can be reduced. Also, since the second lens G2 and third lens G3 are structured so as to satisfy the conditional expressions (6) and (7), the high-order aberration such as the spherical aberration and coma aberration can be corrected properly; and, such structure can also contribute to reducing the size of the imaging lens.

Further, since lens surfaces of each of the first lens G1, second lens G2, third lens G3 and fourth lens G4 are respectively formed as aspherical surfaces which are regulated by even-order and odd-order aspherical surface coefficients, there can be obtained a high aberration performance using the four lenses (that is, using a small number of lenses). Especially, by optimizing the respective aspherical surfaces, the aberration correction can be attained further effectively. For example, because the image-side surfaces of the third lens G3 and fourth lens G4 near to the imaging device are structured such that they have a concave shape on the image side near the optical axis and a convex shape on the image side in the peripheral portion thereof, aberrations can be corrected properly for every angle of view and thus the incident angle of light flux into the imaging device can be controlled to or less than a given angle. This can reduce the shading in the entire area of the image forming surface and can provide an advantage in correcting the field curvature and the distortion. Therefore, the imaging lens is advantageous in reducing the size of the imaging lens and can secure such a high image forming performance as applicable to a digital camera which incorporates therein an imaging device including, for example, five mega-pixels.

Also, since the second lens G2, third lens G3 and fourth lens G4 are respectively made of a resin material, when compared with lenses which are made of an glass material, the complicated aspherical shapes thereof can be formed with higher precision and also the weight of the whole of the imaging lens can be reduced. This is because the second to fourth lenses G2 to G4 are more complicated in shape and are larger in size than the first lens G1. Next, description will be given below in detail of the significance of the conditional expressions (1) to (7).

The conditional expression (1) is an expression which expresses the proper range of an amount (D2/f) representative of the size of an air interval (D2) between the first lens G1 and second lens G2 with respect to the power of the entire lens system. When the imaging lens does not satisfy the limit of the conditional expression (1), the interval D2 between the first lens G1 and second lens G2 cannot be secured sufficiently. On the other hand, when the imaging lens does not satisfy the upper limit of the conditional expression (1), it is difficult to reduce the entire length of the imaging lens.

The conditional expression (2) is an expression which expresses the proper range of an amount (TL/f) representative of a distance (TL) from the object-side surface of the first lens to the imaging surface with respect to the power (1/f) of the entire lens system. By satisfying the conditional expression (2), the entire lens length can be reduced and the interval D2 between the first lens G1 and second lens G2 can be secured more easily. When the imaging lens does not satisfy the upper limit of the conditional expression (2), unfavorably, the entire length of the imaging lens is increased and the size thereof is thus increased.

The conditional expression (3) is an expression which expresses the proper range of an amount (f1/f) representative of the size of the power (1/f1) of the first lens G1 with respect to the power (1/f) of the entire lens system. When the imaging lens does not satisfy the lower limit of the conditional expression (1) and thus the positive power of the first lens G1 becomes too strong, the correction of the spherical aberration becomes insufficient and the size of the whole lens system is increased. On the other hand, when the imaging lens does not satisfy the upper limit of the conditional expression (3) and thus the positive power of the first lens G1 becomes too weak, the back focus of the imaging lens cannot be secured sufficiently.

The conditional expressions (4) and (5) regulate the dispersion of the optical glass used for the first lens G1 with respect at the d-line. By satisfying the conditional expressions (4) and (5), the dispersion can be restricted and the longitudinal chromatic aberration can be reduced.

The conditional expression (6) is an expression which expresses an amount (f2/f) representative of the size of the power (1/f2) of the second lens G2 with respect to the power (1/f) of the entire lens system. When the imaging lens does not satisfy the lower limit of the conditional expression (6) and thus the negative power of the second lens G2 becomes too strong, there is incurred an increase in the high-order aberration. On the other hand, when the imaging lens does not satisfy the lower limit of the conditional expression (6) and thus the negative power of the second lens G2 becomes too weak, it is difficult to correct mainly the spherical aberration and coma aberration.

The conditional expression (7) is an expression which expresses the proper range of an amount (f3/f) representative of the size of the power (1/f3) of the third lens G3 with respect to the power (1/f) of the entire lens system. By arranging the power of the third lens G3 properly, the correction of the respective aberrations and the sufficient back focus can be enforced in a well-balanced manner. Here, when the imaging lens does not satisfy the lower limit of the conditional expression (7) and thus the positive power of the third lens G3 becomes too strong, the sufficient back focus cannot be secured. On the other hand, when the imaging lens does not satisfy the upper limit of the conditional expression (7) and thus the positive power of the third lens G3 becomes too weak, it is difficult to attain the sufficient aberration correction.

As described above, according to the imaging lens of the present embodiment, since the first to fourth lenses G1 to G4 are structured in the above-mentioned manner and the specific conditional expressions are satisfied, while securing a sufficient space for arranging the shutter mechanism, the downsizing of the imaging lens can be realized and the imaging lens can secure a high image forming performance.

Next, description will be given below of the specific numerical examples of an imaging lens according to the embodiments. In the following explanation, first to sixth numerical examples (Examples 1~6) will be described collectively based on the first numerical example (Example 1).

Figure 7:
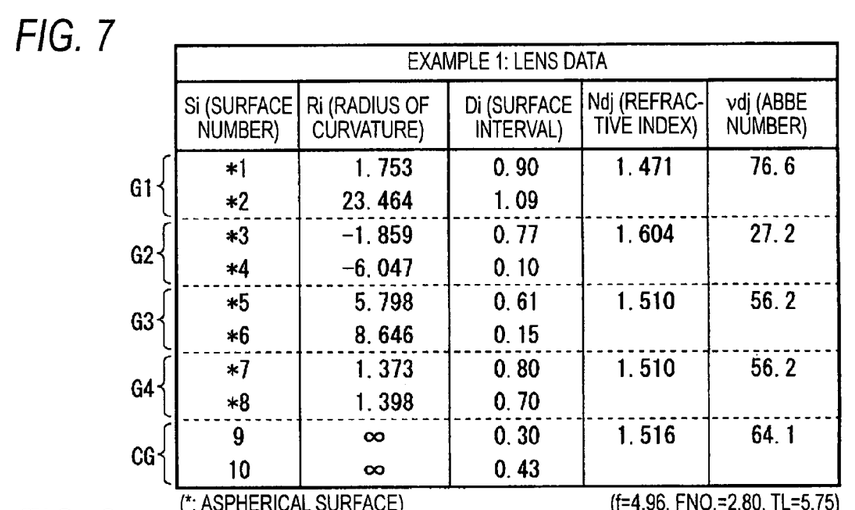
FIG. 7 shows lens data in the imaging lens according to Example 1.
Figure 8:
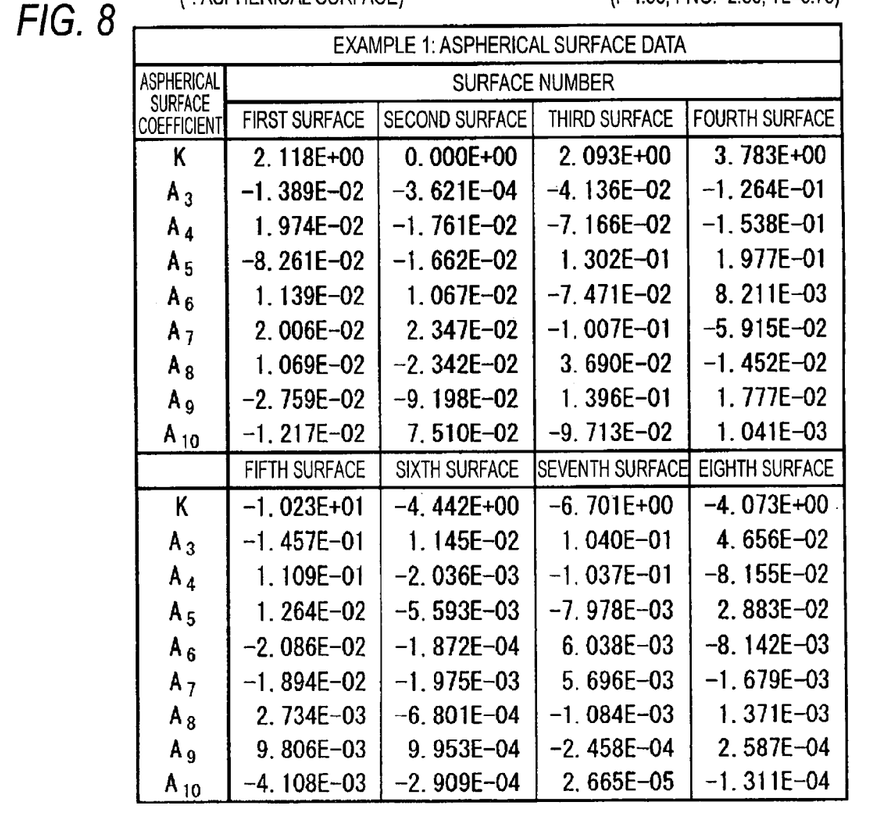
FIG. 8 shows aspherical surface data of the imaging lens according to Example 1.

As Example 1, in FIGS. 7 and 8, there are shown specific lens data which correspond to the configuration of the imaging lens shown in FIG. 1 (the first embodiment). Specifically, FIG. 7 shows lens data, while FIG. 8 shows lens data on aspherical surfaces.

As regards the lens data shown in FIG. 7, in a column for a surface number Si, there are shown the numbers of the i-th (i=1 to 10) surfaces in such a manner that, in correspondence to the sign Si shown in FIG. 1, the surface of a constituent element disposed nearest to the object side except for the aperture diaphragm St is regarded as the first surface and the numbers to be applied to the other remaining constituent elements increase sequentially as they approach the image side. In a column for the radius of curvature Ri, in correspondence to the sign Ri shown in FIG. 1, there are shown the values (mm) of the radius of curvature of the i-th (i=1 to 10) surfaces sequentially in increasing order starting from the object side. In a surface interval Di column as well, in correspondence to the sign Di shown in FIG. 1, there are shown the intervals (mm) along the optical axis between the i-th surface Si and the (i+1)-th surface Si+1 in order from the object side. In dj and vdj columns, respectively, there are shown the refractive indexes and Abbe numbers of the j (j=1 to 5)-th lens elements in order from the object side, at the d-line (587.6 nm). By the way, a sign (*) given to the left side of the surface number Si means that the present lens surface has an aspherical shape; and, for the radius of curvature Ri of the aspherical surface, there is shown the radius of curvature near the optical axis (the paraxial axis). Outside the columns in FIG. 7, as data, there are shown together the values of the focal distance f (mm) of the entire lens system and F number (FNO.).

As regards the aspherical surface data of FIG. 8, there are shown the respective coefficients Ai and K used in an aspherical surface shape expression expressed by the following expression (ASP). Here, Z expresses the length (mm) of a perpendicular dropped from a point, which exists on an aspherical surface at a position of a height h from the optical axis, to a tangent plane to the vertex of the aspherical surface (a plane perpendicular to the optical axis). As the aspherical surface coefficients Ai, there are used not only even-order coefficients $A_4$, $A_6$, $A_8$ and $A_{10}$ but also odd-order coefficients $A_3$, $A_5$, $A_7$ and $A_9$ effectively.

$$Z = C \cdot h^2 / \{1 + (1 - K \cdot C^2 \cdot h^2)^{1/2} + A_3 \cdot h^3 + A_4 \cdot h^4 + A_5 \cdot h^5 + A_6 \cdot h^6 + A_7 \cdot h^7 + A_8 \cdot h^8 + A_9 \cdot h^9 + A_{10} \cdot h^{10}$$ (ASP)

where,

Z: the depth (mm) of an aspheric surface;

h: a distance (height) (mm) from the optical axis to the lens surface;

K: eccentricity;

C: paraxial curvature=1/R (R: paraxial radius of curvature); and

Ai: i-order (i=3 to 10) aspherical surface coefficient.

By the way, in the numerical values of the aspheric surface data, a sign "E" means that a numerical value following this is a "power exponent" having a base of 10, and that this numerical value having a base of 10 and expressed by an exponential function is multiplied by a numerical value before the "E". For example, it means that, for (1.0E−02), (1.0×10$^{-2}$).

Figure 9:
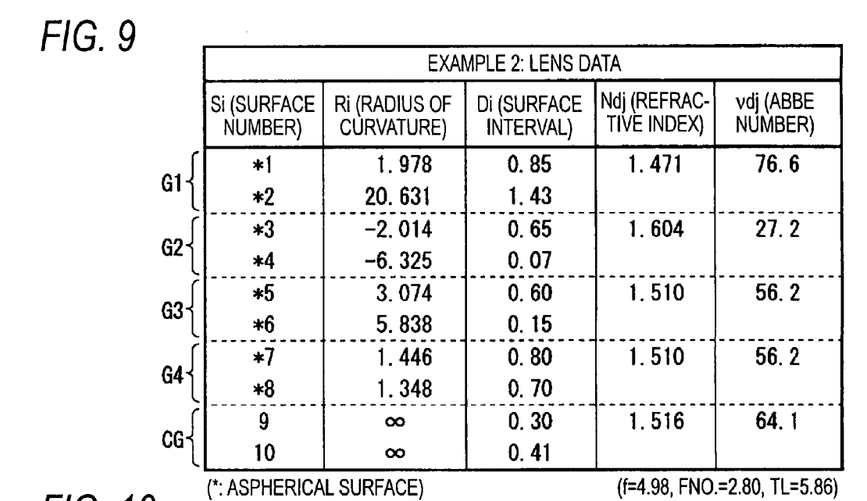
FIG. 9 shows lens data in the imaging lens according to Example 2.
Figure 10:
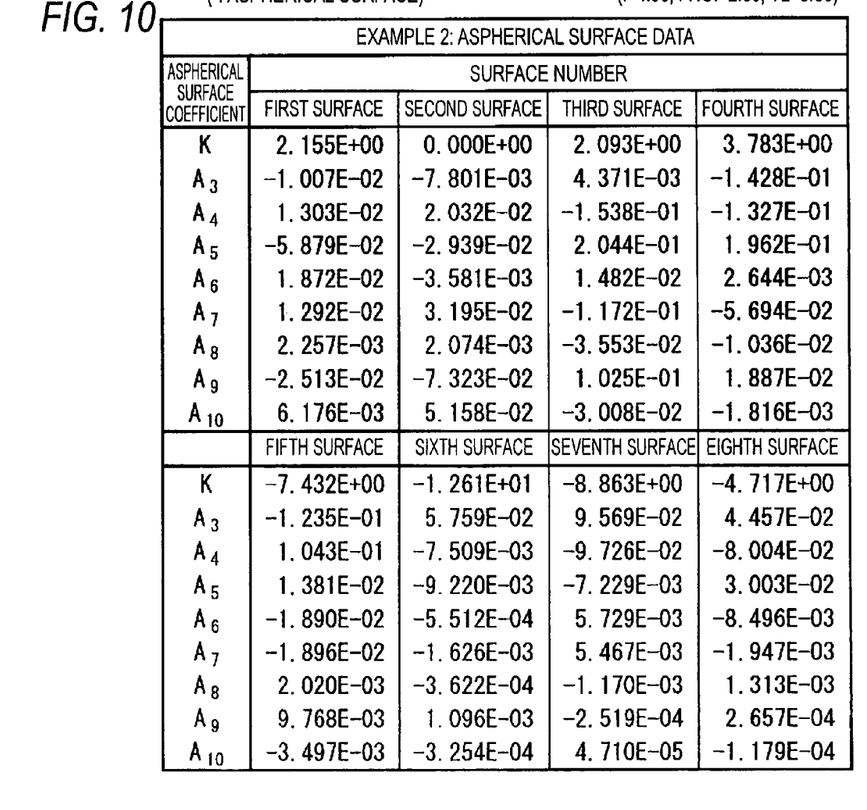
FIG. 10 shows aspherical surface data of the imaging lens according to Example 2.

Similarly to the above-mentioned Example 1, in FIGS. 9 and 10, there are shown specific lens data (Example 2) which correspond to the second exemplary embodiment (FIG. 2). Similarly, in FIGS. 11 and 12, there are shown specific lens data (Example 3) corresponding to the third exemplary embodiment (FIG. 3). Similarly, in FIGS. 13 and 14, there are shown specific lens data (Example 4) corresponding to the fourth exemplary embodiment (FIG. 4). Similarly, in FIGS. 15 and 16, there are shown specific lens data (Example 5) corresponding to the fifth exemplary embodiment (FIG. 5). Similarly, in FIGS. 17 and 18, there are shown specific lens data (Example 6) corresponding to the sixth exemplary embodiment (FIG. 6). By the way, in all of Examples 1 to 6, the surfaces of the first to fourth lenses G1 to G4 are all formed as aspherical surfaces.

Figure 19:
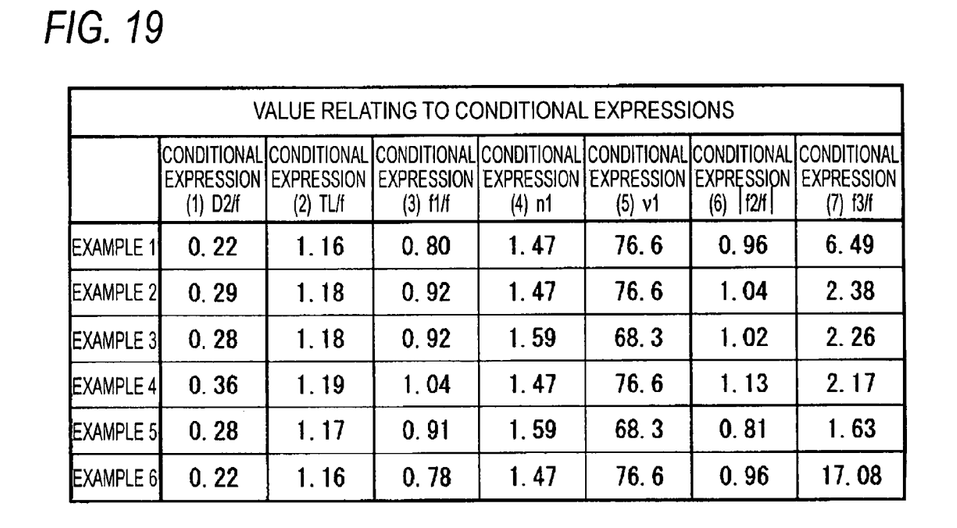
FIG. 19 shows numeric values of the imaging lenses according Example 1 to 6, corresponding to conditional expressions (1) to (7)

Now, FIG. 19 shows values corresponding to the above-mentioned conditional expressions (1) to (7) while putting them together about the respective Examples. As shown in FIG. 19, the values of the respective Examples are all within the numerical value range of the conditional expressions (1) to (7).

Figure 20A:
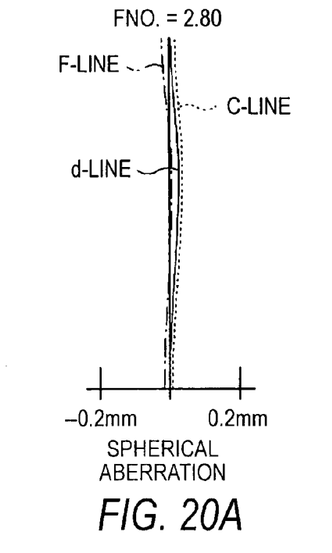
FIG. 20A shows the spherical aberration.
Figure 20B:
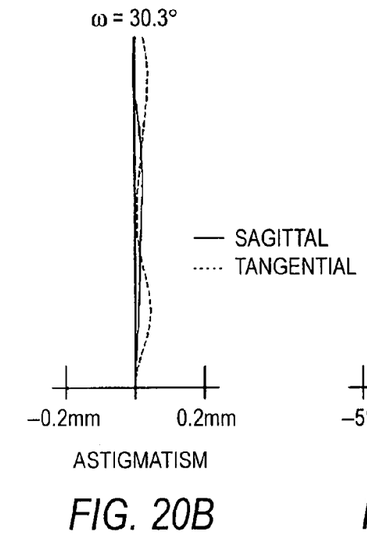
FIG. 20B shows the astigmatism.
Figure 20C:
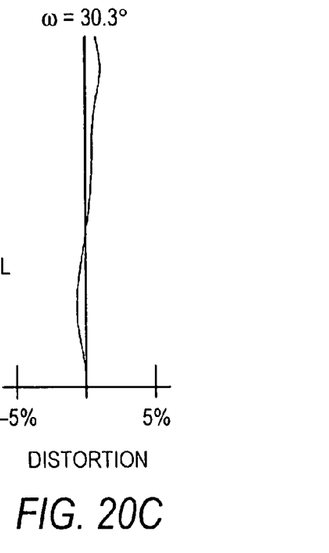
FIG. 20C shows distortion.

FIGS. 20A to 20C show aberrations in the imaging lens according to Example 1. Specifically, FIG. 20A shows the spherical aberration, FIG. 20B shows the astigmatism, and FIG. 20C shows the distortion. In each of these aberration figures, there are shown aberrations at the d-line (587.6 nm) as a reference wavelength. In the spherical aberration figure, there are shown the aberrations at the F-line (wavelength 486.1 nm) and the C-line (wavelength 656.3 nm). In the astigmatism figure, a solid line expresses the aberration in a sagittal direction and a broken line expresses the aberration in a tangential direction.

Figure 21A:
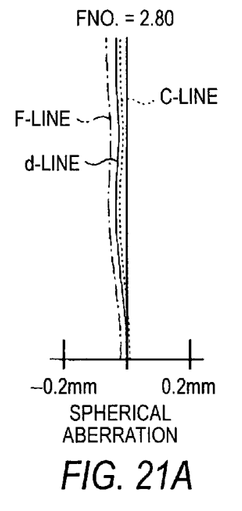
FIG. 21A shows the spherical aberration.
Figures 21B, 21C:
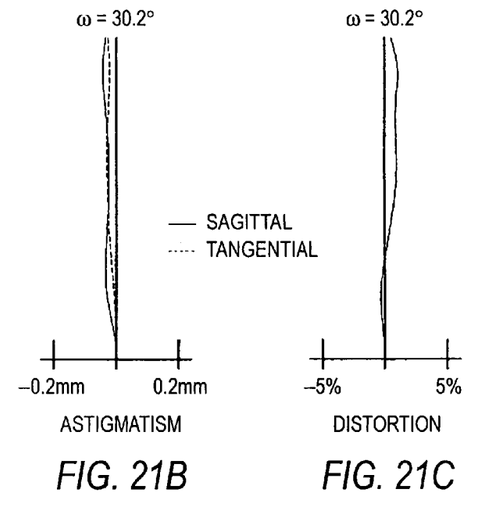
FIG. 21B shows the astigmatism.
FIG. 21C shows distortion.
Figure 22A:
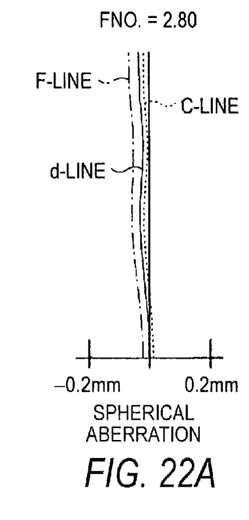
FIG. 22A shows the spherical aberration.
Figures 22B, 22C:
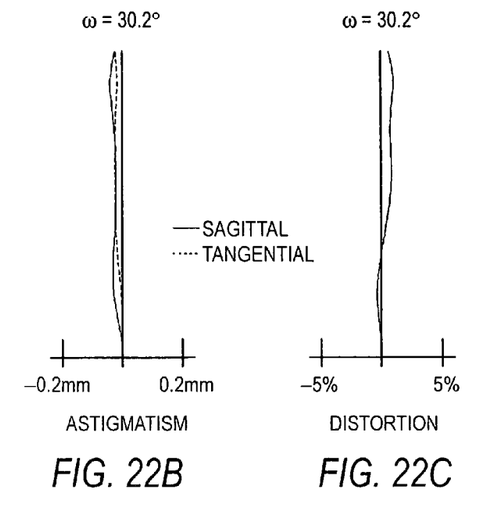
FIG. 22B shows the astigmatism.
FIG. 22C shows distortion.
Figure 23A:
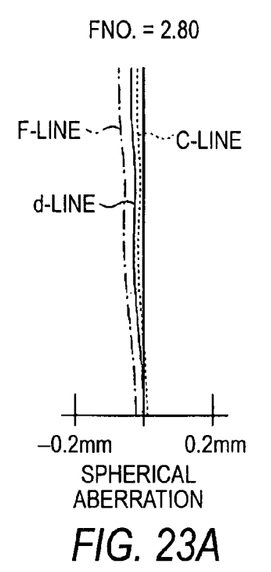
FIG. 23A shows the spherical aberration.
Figures 23B, 23C:
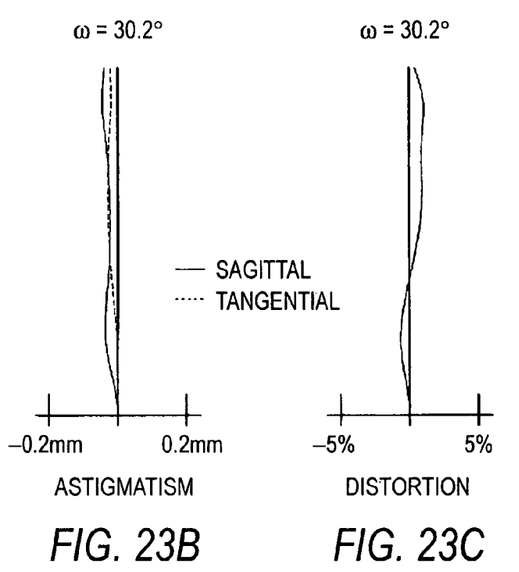
FIG. 23B shows the astigmatism.
FIG. 23C shows distortion.
Figure 24A:
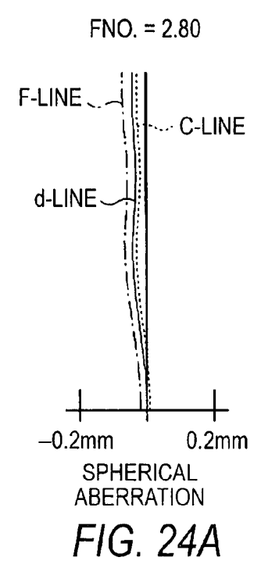
FIG. 24A shows the spherical aberration.
Figures 24B, 24C:
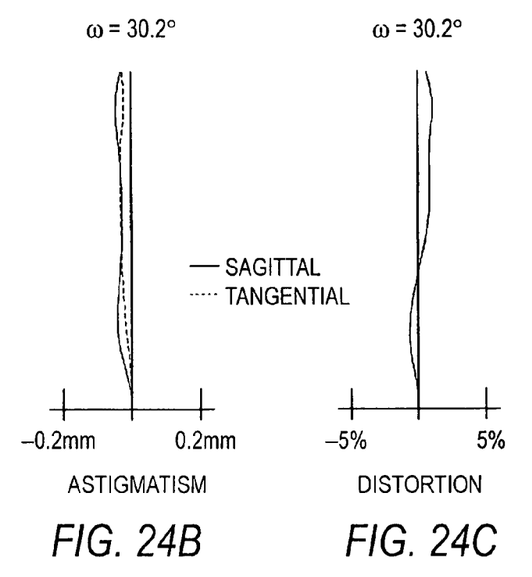
FIG. 24B shows the astigmatism.
FIG. 24C shows distortion.
Figure 25A:
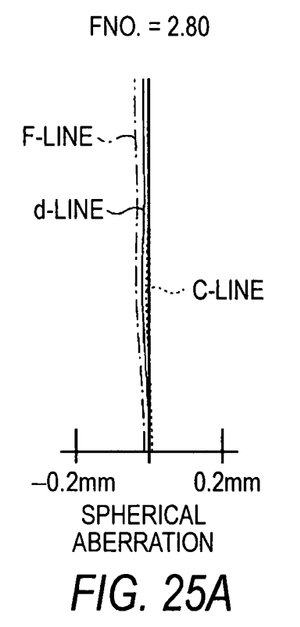
FIG. 25A shows the spherical aberration.
Figures 25B, 25C:
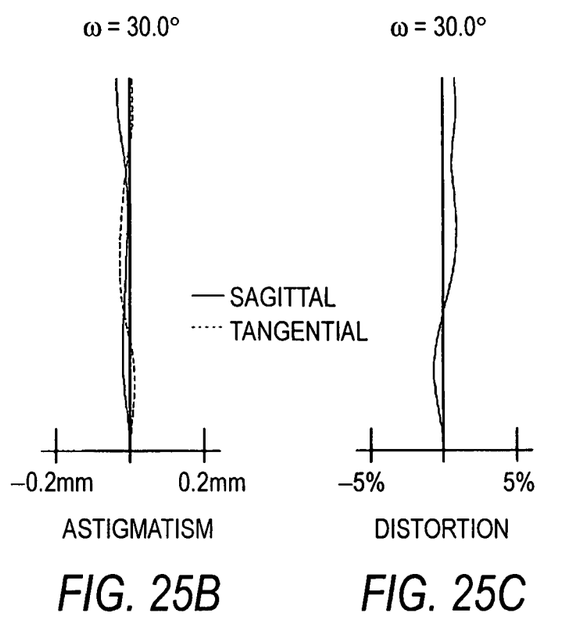
FIG. 25B shows the astigmatism.
FIG. 25C shows distortion.

Similarly, the aberrations of an imaging lens according to Example 2 are shown in FIGS. 21A to 21C. Similarly, the aberrations of an imaging lens according to Example 3 are shown in FIGS. 22A to 22C. Similarly, the aberrations of an imaging lens according to Example 4 are shown in FIGS. 23A to 23C. Similarly, the aberrations of an imaging lens according to Example 5 are shown in FIGS. 24A to 24C. Similarly, the aberrations of an imaging lens according to Example 6 are shown in FIGS. 25A to 25C.

As can be understood clearly from the above-mentioned lens data and aberration figures, in the respective Examples, while securing a sufficient space for arranging the shutter mechanism within the lens system, the reduced size and enhanced performance of the imaging lens can be realized.

Although description has been given heretofore of the invention with reference to the above-mentioned embodiments and examples, the invention is not limited to such embodiments and examples but various modifications are also possible. For example, the values of the radii of curvature, surface intervals and refractive indexes of the respective lens components are not limited to the values that are shown in the above-mentioned numerical examples, but other values can also be used. Also, in the above-mentioned embodiments and examples, the both surfaces of the first to fourth lenses are all formed as aspherical surfaces; however, the invention is not limited to this.

This application claims foreign priority from Japanese Patent Application No. 2006-166584, filed Jun. 15, 2006, the entire disclosure of which is herein incorporated by reference.

What is claimed is:

1. An imaging lens comprising: in order from an object side of the imaging lens,
   a first lens having a convex surface on the object side thereof and having a positive power;
   an aperture diaphragm;
   a second lens having a concave surface on the object side thereof and having a negative power;
   a third lens having a positive power; and
   a fourth lens having a convex surface on the object side thereof and near an optical axis thereof, the fourth lens having a meniscus shape,
   wherein the imaging lens satisfies conditional expressions:

$$0.2 < D2/f < 0.4 \quad (1)$$

$$TL/f < 1.3 \quad (2)$$

wherein
   f represents a focal distance of the imaging lens;
   D2 represents an air interval between the first lens and second lens along an optical axis of the imaging lens; and
   TL represents a distance along the optical axis from an object-side surface of the first lens to an image forming surface.

2. The imaging lens according to claim 1, further satisfying conditional expressions:

$$0.7 < f1/f < 1.2 \quad (3)$$

$$1.45 < n1 < 1.6 \quad (4)$$

$$v1 > 60 \quad (5)$$

$$0.8 < |f2/f| < 1.3 \quad (6)$$

$$1.0 < f3/f < 20 \quad (7)$$

wherein
   f1 represents a focal distance of the first lens;
   n1 represents a refractive index of the first lens at the d-line;
   v1 represents an Abbe number of the first lens at the d-line;
   f2 represents a focal distance of the second lens; and
   f3 represents a focal distance of the third lens.

3. The imaging lens according to claim 1, wherein each of the second, third and fourth lenses has at least one aspherical surface.

4. The imaging lens according to claim 1, wherein the first lens has at least one aspherical surface.

5. The imaging lens according to claim 1, wherein each of the second, third and fourth lenses is made of a resin material.

6. The imaging lens according to claim 1, wherein the first lens is made of optical glass.

7. The imaging lens according to claim 2, wherein each of the second, third and fourth lenses has at least one aspherical surface.

8. The imaging lens according to claim 2, wherein the first lens has at least one aspherical surface.

9. The imaging lens according to claim 2, wherein each of the second, third and fourth lenses is made of a resin material.

10. The imaging lens according to claim 3, wherein the first lens has at least one aspherical surface.

11. The imaging lens according to claim 3, wherein each of the second, third and fourth lenses is made of a resin material.

12. The imaging lens according to claim 4, wherein each of the second, third and fourth lenses is made of a resin material.

13. The imaging lens according to claim 7, wherein the first lens has at least one aspherical surface.

14. The imaging lens according to claim 7, wherein each of the second, third and fourth lenses is made of a resin material.

15. The imaging lens according to claim 8, wherein each of the second, third and fourth lenses is made of a resin material.

16. The imaging lens according to claim 10, wherein each of the second, third and fourth lenses is made of a resin material.

17. The imaging lens according to claim 13, wherein each of the second, third and fourth lenses is made of a resin material.

18. The imaging lens according to claim 17, wherein the first lens is made of optical glass.

19. The imaging lens according to claim 15, wherein the first lens is made of optical glass.

20. The imaging lens according to claim 9, wherein the first lens is made of optical glass.

21. The imaging lens according to claim 16, wherein the first lens is made of optical glass.

22. The imaging lens according to claim 12, wherein the first lens is made of optical glass.

* * * * *